US012179522B2

(12) United States Patent
Kosugi et al.

(10) Patent No.: US 12,179,522 B2
(45) Date of Patent: Dec. 31, 2024

(54) VEHICLE-MOUNTED TIRE POSITION DETECTION SYSTEM

(71) Applicant: KABUSHIKI KAISHA TOKAI RIKA DENKI SEISAKUSHO, Aichi (JP)

(72) Inventors: Masanori Kosugi, Aichi (JP); Akito Kumagai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 253 days.

(21) Appl. No.: 17/972,851

(22) Filed: Oct. 25, 2022

(65) Prior Publication Data

US 2023/0140829 A1 May 4, 2023

(30) Foreign Application Priority Data

Oct. 29, 2021 (JP) .................................. 2021-177904

(51) Int. Cl.
*B60C 23/04* (2006.01)
(52) U.S. Cl.
CPC ...... *B60C 23/0489* (2013.01); *B60C 23/0454* (2013.01)
(58) Field of Classification Search
USPC ................................................ 73/146–146.8
See application file for complete search history.

(56) References Cited

U.S. PATENT DOCUMENTS

| | | | | |
|---|---|---|---|---|
| 9,061,554 B2* | 6/2015 | Kosugi | ............... | B60C 23/0416 |
| 9,193,224 B2* | 11/2015 | Kosugi | ............... | B60C 23/0488 |
| 9,694,631 B2* | 7/2017 | Tsuchikawa | ........ | B60C 23/0488 |
| 9,849,736 B2* | 12/2017 | Watanabe | ........... | B60C 23/0455 |
| 10,166,822 B2* | 1/2019 | Kosugi | ............... | B60C 23/0488 |
| 2012/0259507 A1 | 10/2012 | Fink | | |
| 2017/0106706 A1* | 4/2017 | Bettecken | ........... | B60C 23/0488 |
| 2023/0136318 A1* | 5/2023 | Kosugi | ............... | B60C 23/0489 73/146 |

FOREIGN PATENT DOCUMENTS

| | | | | | |
|---|---|---|---|---|---|
| CN | 103895459 A | * | 7/2014 | ........ | B60C 23/0415 |
| DE | 102009059788 A1 | * | 6/2011 | ........ | B60C 23/0416 |
| JP | H10115625 A | * | 5/1998 | | |
| JP | 2013-514934 A | | 5/2013 | | |
| TW | 201412574 A | * | 4/2014 | ........ | B60C 23/0415 |

* cited by examiner

*Primary Examiner* — Andre J Allen
(74) *Attorney, Agent, or Firm* — GREENBLUM & BERNSTEIN, P.L.C.

(57) ABSTRACT

A vehicle-mounted system provided in a vehicle including a tire includes a detector attached to the tire, the detector transmitting a detection signal, and a monitoring unit that determines a position of the tire based on a plurality of detection signals received from the detector. The detector determines a direction of revolution of the tire, and when the detector determines that the direction of revolution of the tire has changed, it switches a frequency of transmission of the detection signal from a first frequency to a second frequency higher than the first frequency.

7 Claims, 11 Drawing Sheets

FIG.4
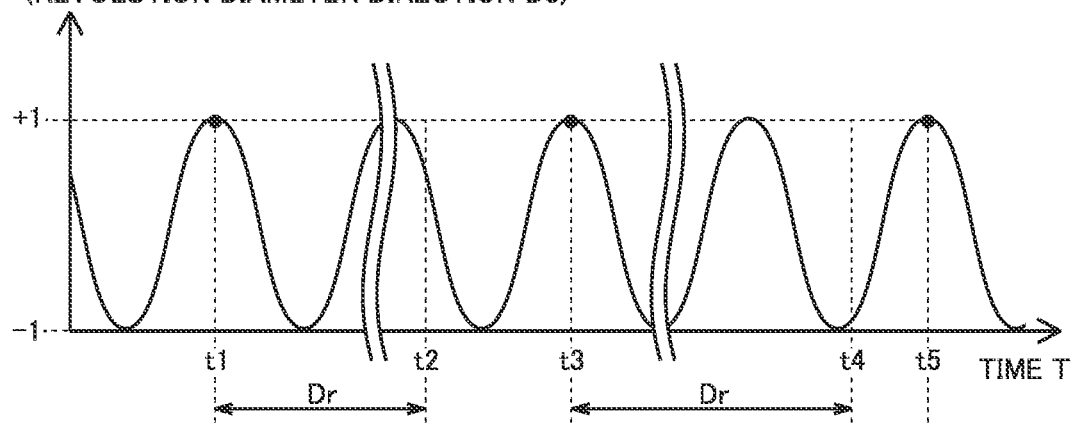
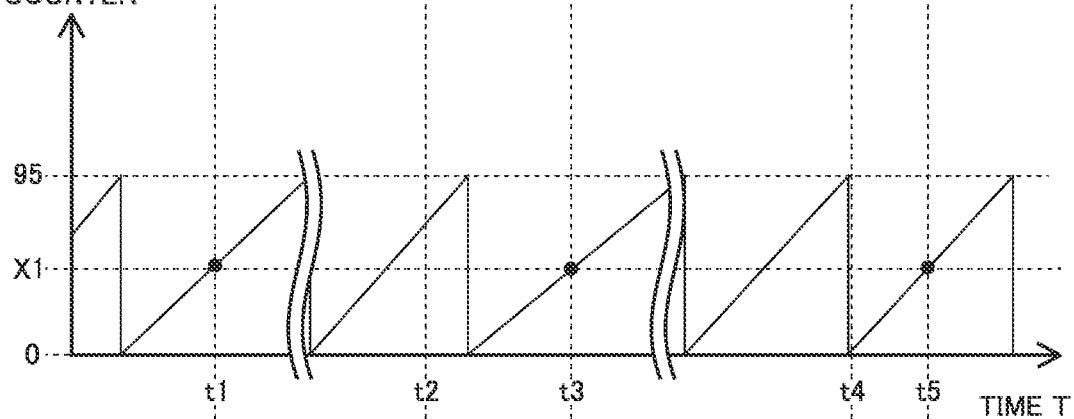
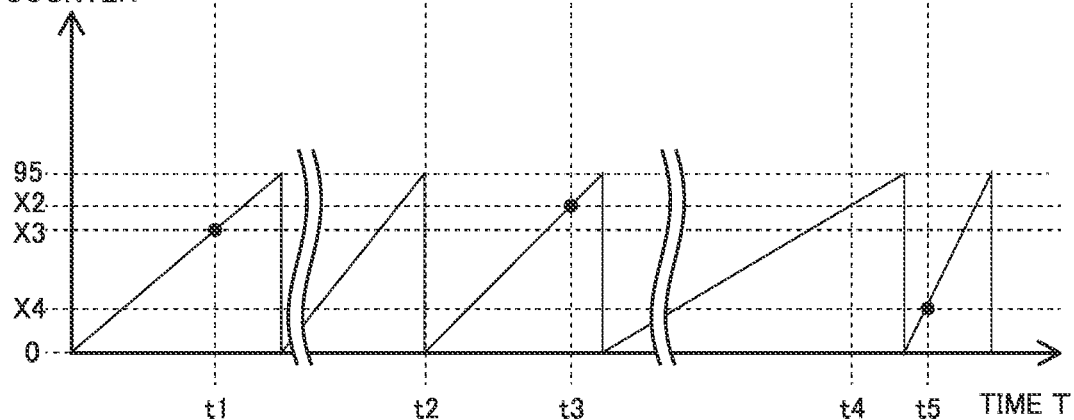

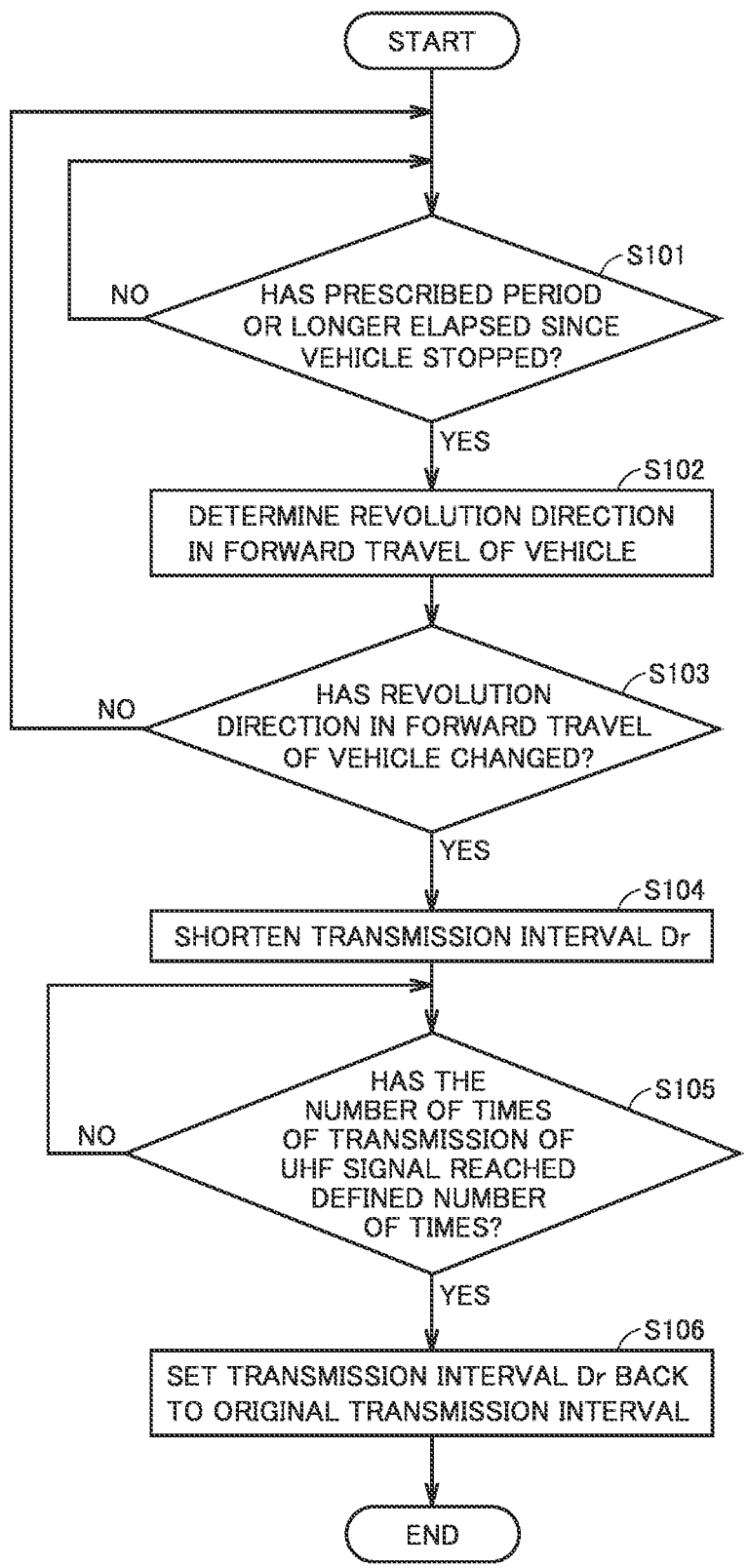

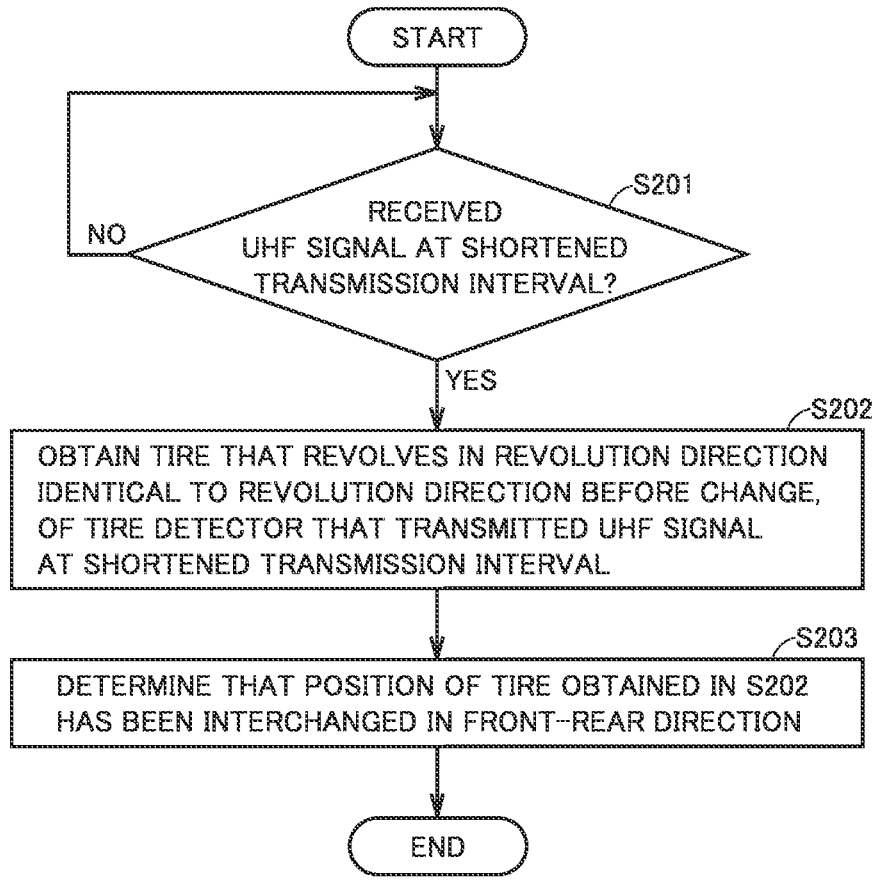

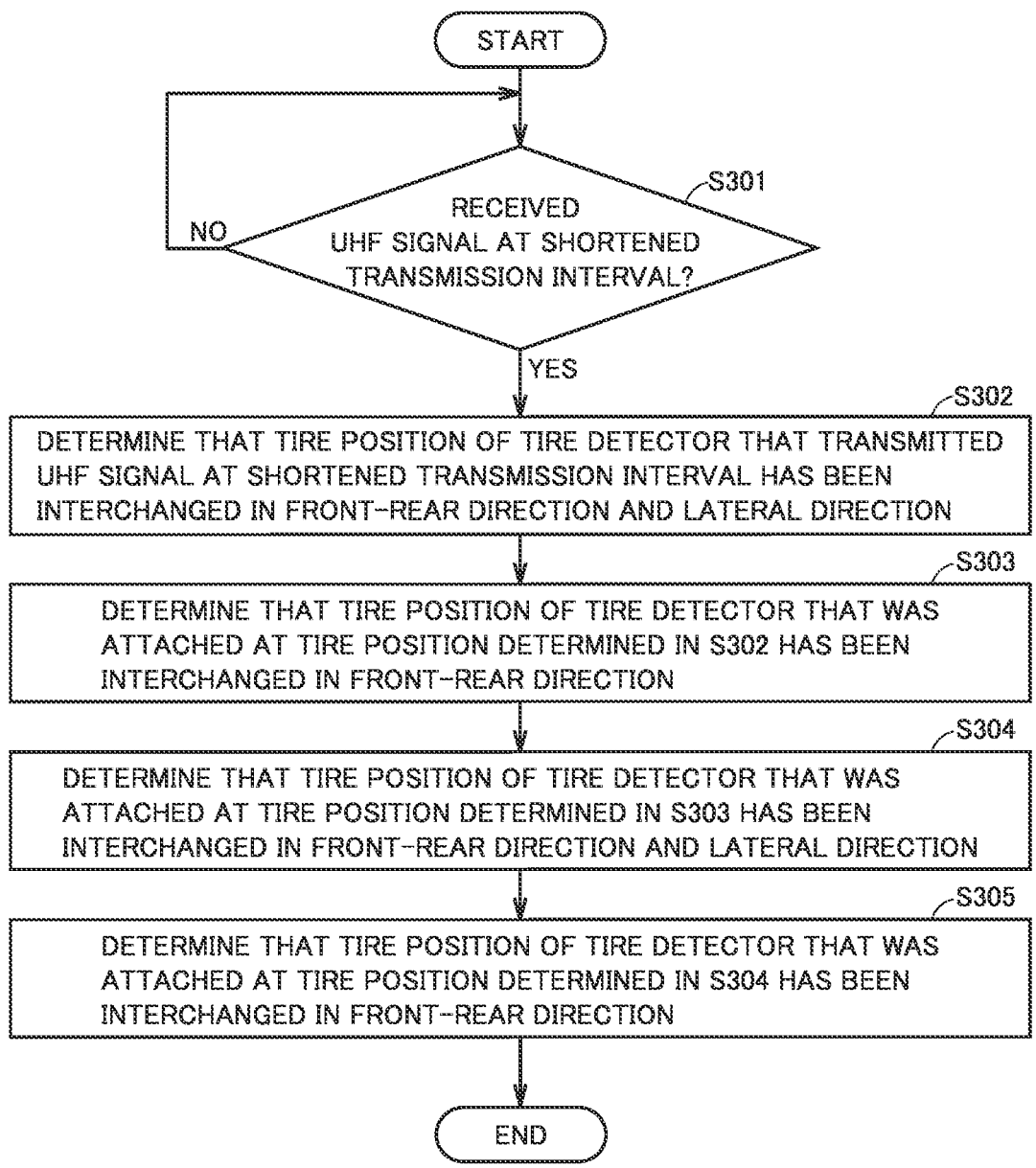

VEHICLE-MOUNTED TIRE POSITION DETECTION SYSTEM

This nonprovisional application is based on Japanese Patent Application No. 2021-177904 filed with the Japan Patent Office on Oct. 29, 2021, the entire contents of which are hereby incorporated by reference.

BACKGROUND OF THE INVENTION

Field of the Invention

The present disclosure relates to a vehicle-mounted system.

Description of the Background Art

In a tire pressure monitoring system (TPMS) in a vehicle, a detector has conventionally been attached to each of a plurality of tires. The detector attached to each of the plurality of tires transmits pneumatic pressure information to a processing device such as an ECU attached to a vehicle body.

Some TPMS's are provided with an auto location function to automatically determine to which tire among a plurality of tires a detector is attached.

Japanese National Patent Publication No. 2013-514934 describes an apparatus for localizing installation positions of vehicle wheels including a rotation speed sensor that detects a rotation speed of a vehicle wheel such as an ABS rotation speed sensor and a wheel electronics unit disposed in the vehicle wheel. The wheel electronics unit is allocated to each tire and transmits information on an angle of rotation of the tire and information on a pressure of the tire to a vehicle side. Each vehicle wheel is provided with ninety-six edges in total per revolution, and the rotation speed sensor counts the number of times of passage of a reference position over the edge as a result of rotation of the vehicle wheel to detect the rotation speed of the vehicle wheel.

A unit on the vehicle side in Japanese National Patent Publication No. 2013-514934 obtains the angle of rotation of the tire detected by the wheel electronics unit and the rotation speed of the vehicle wheel detected by the rotation speed sensor and localizes the installation positions of the vehicle wheels based on relation between the angle of rotation of the tire and the rotation speed of the vehicle wheel that have been obtained.

SUMMARY OF THE INVENTION

In order to derive relation between the angle of rotation detected by the wheel electronics unit and the rotation speed detected by the rotation speed sensor, the apparatus for localizing installation positions of vehicle wheels in Japanese National Patent Publication No. 2013-514934 obtains information on a plurality of angles of rotation from the wheel electronics unit. Therefore, after a plurality of times of transmission and reception between the wheel electronics unit and a vehicle-side unit, the unit on the vehicle side determines the installation positions of the vehicle wheels.

When a frequency of transmission of the information on the angle of rotation is low, it takes time to collect information necessary for determination of the installation positions of the vehicle wheels, and consequently, a total time period for determination of the installation positions of the vehicle wheels may become long. On the other hand, when a frequency of transmission of information on the angle of rotation is high, transmission and reception are frequent also when tires are not rotated, and consequently, power consumption by the wheel electronics unit may increase.

The present disclosure was made to solve the problem described above, and an object thereof is to shorten a time period required for determination of a tire position while increase in power consumption by a tire detector attached to the tire is prevented in a vehicle-mounted system that determines a tire position after a plurality of times of transmission and reception of data between the tire detector and a control device on a vehicle side.

A vehicle-mounted system according to one aspect of the present disclosure is a vehicle-mounted system provided in a vehicle including a tire, and includes a detector attached to the tire, the detector transmitting a detection signal, and a monitoring unit that determines a position of the tire based on a plurality of detection signals received from the detector. The detector determines a direction of revolution of the tire, and when the detector determines change of the direction of revolution of the tire, the detector switches a frequency of transmission of the detection signal from a first frequency to a second frequency higher than the first frequency.

According to the aspect above, whether or not tires have been rotated is determined based on change in direction of revolution of the tire. When it is determined that the tires have been rotated, a frequency of transmission of a detection signal is increased. Thus, time required for determination of a tire position can be shortened while increase in power consumption by the tire detector is prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram for illustrating an exemplary method of determining a tire position in the present embodiment.

FIG. 9 is a flowchart showing processing for switching a frequency of transmission of a UHF signal.

FIG. 10 is a flowchart showing tire position determination processing based on a direction of revolution of the tire.

FIG. 11 is a flowchart showing tire position determination processing on the premise that the tire rotation in FIG. 7 is carried out.

DESCRIPTION OF THE PREFERRED EMBODIMENTS

Figure 1:
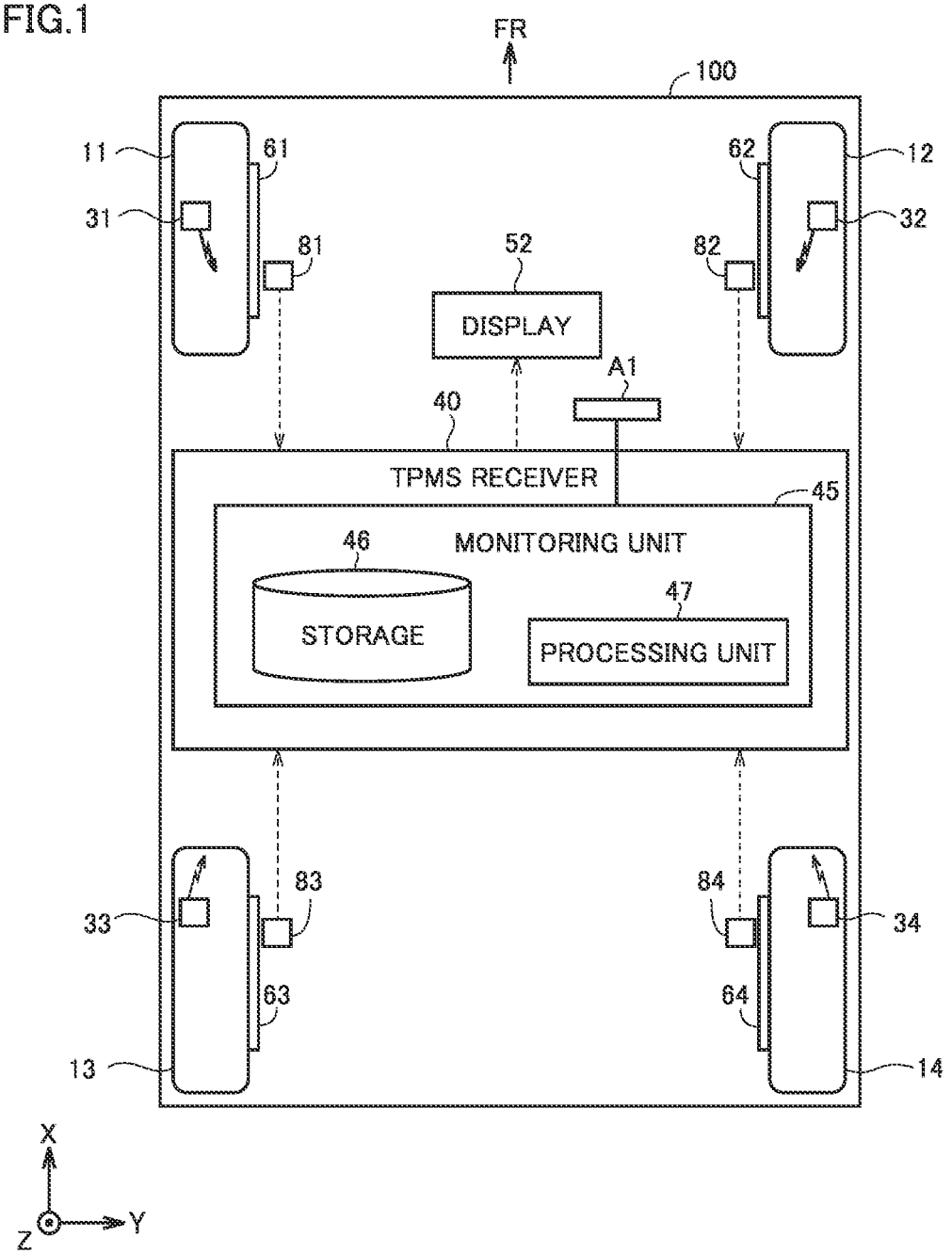
FIG. 1 is a diagram schematically showing a configuration of a vehicle to which a vehicle-mounted system according to the present embodiment is applied.

An embodiment of the present disclosure will be described in detail below with reference to the drawings. The same or corresponding elements in the drawings have the same reference characters allotted and description thereof will not be repeated.

<Overall Configuration>

FIG. 1 is a diagram schematically showing a configuration of a vehicle 100 to which a vehicle-mounted system according to the present embodiment is applied.

Vehicle 100 according to the present embodiment is a vehicle including tires 11 and 12 as front wheels which are steering wheels and tires 13 and 14 as rear wheels which are non-steering wheels. Vehicle 100 is of a front-wheel drive type. Vehicle 100 may be of a rear-wheel drive type or an all-wheel drive type. A direction FR shown in FIG. 1 represents a direction of forward travel of vehicle 100.

In the description below, a vertical direction when vehicle 100 is arranged on the plane is defined as a "Z-axis direction," a direction perpendicular to the Z-axis direction, in the direction of forward travel of vehicle 100, is defined as a "positive direction along an X axis," and a direction perpendicular to an X-axis direction is defined as a "Y-axis direction." Hereafter, a positive direction along a Z axis in each figure may be referred to as an upper side and a negative direction along the Z axis may be referred to as a lower side, the positive direction along the X axis may be referred to as a front side and a negative direction along the X axis may be referred to as a rear side, and a positive direction along a Y axis may be referred to as a right side and a negative direction along the Y axis may be referred to as a left side.

Vehicle 100 includes a system that monitors a pneumatic pressure of each tire (TPMS). Specifically, vehicle 100 includes a plurality of tire detectors 31 to 34 each detecting a tire pressure, revolution speed sensors 81 to 84 detecting revolution speeds of revolution bodies 61 to 64 attached to the tires, respectively, and a TPMS receiver 40. Tire detectors 31 to 34 are attached to wheels of tires 11 to 14, respectively. Tire detectors 31 to 34 may each be formed integrally with a valve for intake of air into each tire. Tire detectors 31 to 34 may each be formed separately from the valve.

Each of tire detectors 31 to 34 is activated when a prescribed activation condition is satisfied, and detects a pneumatic pressure of each tire and transmits a radio signal in an ultra high frequency (UHF) band (which is also simply referred to as a "UHF signal" below) that includes a result of detection. The "prescribed activation condition" is set in advance to be satisfied regularly or irregularly. Tire detectors 31 to 34 are thus intermittently activated at timings different from one another and transmit UHF signals.

The UHF signals outputted from tire detectors 31 to 34 include information indicating specific ID numbers for identifying at least respective tire detectors 31 to 34. Specifically, the UHF signal outputted from tire detector 31 includes "01" as the ID number and the UHF signal outputted from tire detector 32 includes "02" as the ID number. The UHF signal outputted from tire detector 33 includes "03" as the ID number and the UHF signal outputted from tire detector 34 includes "04" as the ID number.

The UHF signals outputted from tire detectors 31 to 34 each include information representing a tire pressure in addition to the information indicating the ID number. As TPMS receiver 40 receives the UHF signal outputted from each of tire detectors 31 to 34, it can monitor a pneumatic pressure of each tire.

Tires identical in specifications and construction are employed as tires 11 to 14 for allowing tire rotation. Therefore, tire detectors identical in configuration are adopted also for tire detectors 31 to 34. When tires 11 to 14 do not have to be described as being distinguished from one another, tires 11 to 14 are simply referred to as a "tire 10" below.

When tire detectors 31 to 34 do not have to be described as being distinguished from one another, tire detectors 31 to 34 are simply referred to as a "tire detector 30."

TPMS receiver 40 is provided on a vehicle body side of vehicle 100. TPMS receiver 40 includes a monitoring unit 45 that monitors a pneumatic pressure of each tire. Monitoring unit 45 includes a storage 46, a processing unit 47, and an antenna A1. Antenna A1 is configured to receive a UHF signal transmitted from tire detector 30. Monitoring unit 45 accepts the UHF signal received by antenna A1.

Processing unit 47 includes a processor such as a not-shown central processing unit (CPU), a memory, and an input and output buffer. The memory includes a read only memory (ROM) and a random access memory (RAM). The processor develops a program stored in the ROM on the RAM and executes the same. Various types of processing performed by processing unit 47 are described in the program stored in the ROM.

Information indicating a position of a tire where each tire detector 30 is attached and information indicating a tire pressure are stored in storage 46 as being brought in correspondence with an ID number of each tire detector 30. In the present embodiment, four tire positions (a front left side, a front right side, a rear left side, and a rear right side) in total are set by a tire position determination method which will be described later, and an ID number of each tire detector 30 is brought in correspondence with any one tire position.

Specifically, the tire position "front left side" is brought in correspondence with the ID number "01" and the tire position "front right side" is brought in correspondence with the ID number "02". The tire position "rear left side" is brought in correspondence with the ID number "03" and the tire position "rear right side" is brought in correspondence with the ID number "04". When tires are rotated and monitoring unit 45 detects attachment at different tire positions, monitoring unit 45 updates relation between the ID number and the tire position.

When monitoring unit 45 receives a UHF signal, it checks the ID number included in the UHF signal against the ID number stored in storage 46, and obtains the tire position brought in correspondence with the ID number. Monitoring unit 45 updates the pneumatic pressure at the obtained tire position with the tire pressure included in the UHF signal.

For example, when monitoring unit 45 receives the UHF signal including the ID number "01", it refers to correspondence between the ID number "01" and the tire position stored in storage 46. In storage 46, the "front left side" is brought in correspondence with the ID number "01" as the tire position. Monitoring unit 45 updates the pneumatic pressure on the "front left side" with the tire pressure included in the UHF signal.

TPMS receiver 40 can have information on correspondence between the tire position and the tire pressure stored in storage 46 shown on a display 52. Display 52 is arranged at a position where a driver can visually recognize the same. Display 52 is arranged, for example, in an instrument panel within the vehicle.

Monitoring unit 45 performs tire pressure determination processing for determining whether or not the tire pressure included in the received UHF signal is equal to or lower than a low-pressure threshold value. When the tire pressure is equal to or lower than the low-pressure threshold value, monitoring unit 45 has the tire position where the tire pressure has become the low-pressure threshold value shown on display 52 together with a warning. TPMS receiver 40 performs tire pressure determination processing each time it receives the UHF signal and monitors each pneumatic pressure of the tire. The driver can thus recognize in real time the position of the tire the tire pressure of which has become equal to or lower than the low-pressure threshold value.

Revolution speed sensors 81 to 84 are each a vehicle wheel speed sensor included, for example, in an antilock brake system (ABS). Revolution bodies 61 to 64 that revolve in synchronization with tires 11 to 14 are attached to tires 11 to 14, respectively. Examples of revolution bodies 61 to 64 include a wheel, an axle, and a gear. When revolution speed sensors 81 to 84 do not have to be described as being distinguished from one another, revolution speed sensors 81 to 84 are simply referred to as a "revolution speed sensor 80" below. When revolution bodies 61 to 64 do not have to be described as being distinguished from one another, revolution bodies 61 to 64 are simply referred to as a "revolution body 60" below.

Revolution body 60 is provided with a detection mechanism such as a plurality of (for example, forty-eight) magnets or teeth. Revolution speed sensor 80 transmits a pulsed signal of rectangular waves to TPMS receiver 40 with the use of the detection mechanism such as the magnets or the teeth provided in revolution body 60. Revolution speed sensor 80 detects both of a rising edge and a falling edge of the pulsed signal and detects ninety-six pulses (counter value: 0 to 95) per revolution of the tire. Revolution speed sensor 80 starts counting with an angle of revolution of tire 10 at the time of ignition ON being defined as a reference point (0). A counter value of revolution speed sensor 80 increases from 0 to 95 in one revolution of tire 10 and returns to 0 when tire 10 makes one revolution.

Each revolution speed sensor 80 and the tire position are stored in storage 46 as being brought in correspondence. Specifically, the "front left side" is brought in correspondence with revolution speed sensor 81 and the "front right side" is brought in correspondence with revolution speed sensor 82. The "rear left side" is brought in correspondence with revolution speed sensor 83 and the "rear right side" is brought in correspondence with revolution speed sensor 84.

<Configuration of Tire Detector 30>

Figure 2:
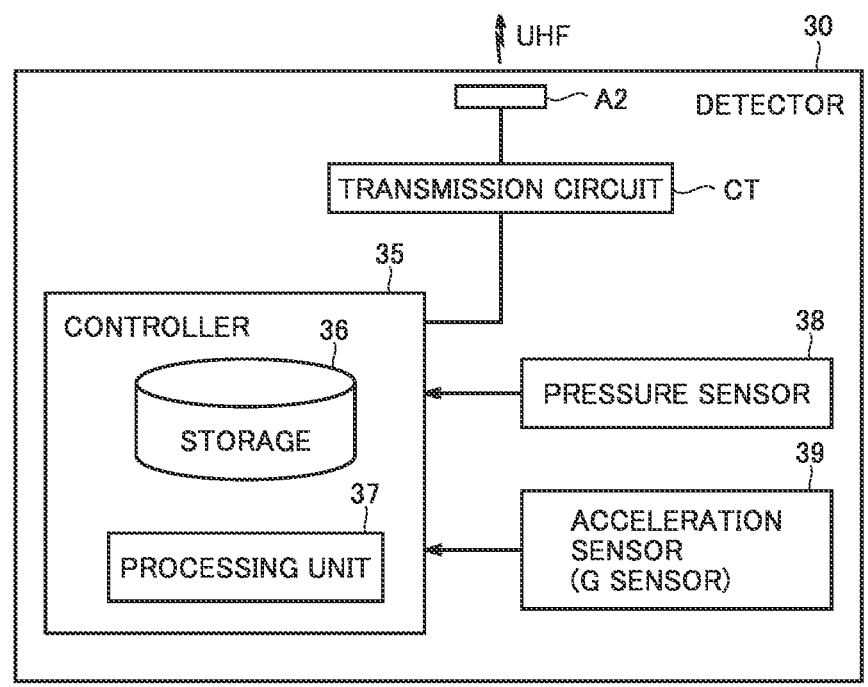
FIG. 2 is a block diagram showing an exemplary configuration of a tire detector.

An exemplary configuration of tire detector 30 will be described below with reference to FIGS. 2 and 3. FIG. 2 is a block diagram showing an exemplary configuration of tire detector 30. As shown in FIG. 2, tire detector 30 includes a controller 35, a pressure sensor 38, an acceleration sensor (G sensor) 39, an antenna A2, and a transmission circuit CT.

Controller 35 includes a storage 36 and a processing unit 37. Processing unit 37 includes a processor such as a not-shown CPU, a memory, and an input and output buffer. The memory includes a ROM and a RAM. The processor develops a program stored in the ROM on the RAM and executes the same. Various types of processing performed by processing unit 37 are described in the program stored in the ROM.

In storage 36, an ID number specific for each tire detector 30 shown in FIG. 1 is stored. In storage 36 of tire detector 31, "01" is stored as the ID number, and in storage 36 of tire detector 32, "02" is stored as the ID number. In storage 36 of tire detector 33, "03" is stored as the ID number, and in storage 36 of tire detector 34, "04" is stored as the ID number.

Controller 35 controls transmission circuit CT to transmit a UHF signal from antenna A2. Controller 35 outputs the UHF signal at timing when a prescribed activation condition is satisfied. Tire detector 30 is provided with a not-shown battery, and operates with electric power supplied from the battery. This battery is constructed not to readily externally be charged. Therefore, in tire detector 30 in a first embodiment, desirably, operating time is minimized to suppress power consumption by tire detector 30.

From this point of view, the "prescribed activation condition" is set in advance to suppress a frequency of activation of tire detector 30 as much as possible. For example, the prescribed activation condition may include such a timer-based activation condition that a timer has counted lapse of prescribed timer time since previous stop and such an acceleration-based activation condition that a result of detection (which is also referred to as an "acceleration G" below) by acceleration sensor 39 has attained to a specific value (for example, a maximum value or a minimum value).

The "timer time" used as the timer-based activation condition described above may be set to a fixed value or a variable value that varies with acceleration G. For example, controller 35 may determine whether or not a tire is revolving based on acceleration G which represents the result of detection by acceleration sensor 39 and change the set timer time.

In the vehicle-mounted system in the present embodiment, for a tire position determination method which will be described later, a "prescribed activation condition" in travel of vehicle 100 is determined. Tire detector 30 transmits a UHF signal, with the fact that a gravity component included in acceleration G has attained to a specific value after lapse of a prescribed transmission interval since last transmission of the UHF signal being defined as the "prescribed activation condition."

Acceleration sensor 39 detects an acceleration generated in a biaxial direction in tire detector 30 and outputs a result of detection to controller 35. Pressure sensor 38 detects a tire pressure and outputs a result of detection (which is also referred to as a "tire pressure P" below) to controller 35.

The UHF signal includes information indicating acceleration G and information on time of detection of acceleration G in addition to the ID number stored in storage 36 and information indicating tire pressure P. Tire detector 30 may further include a temperature sensor that detects a tire temperature in addition to pressure sensor 38 and acceleration sensor 39.

Figure 3:
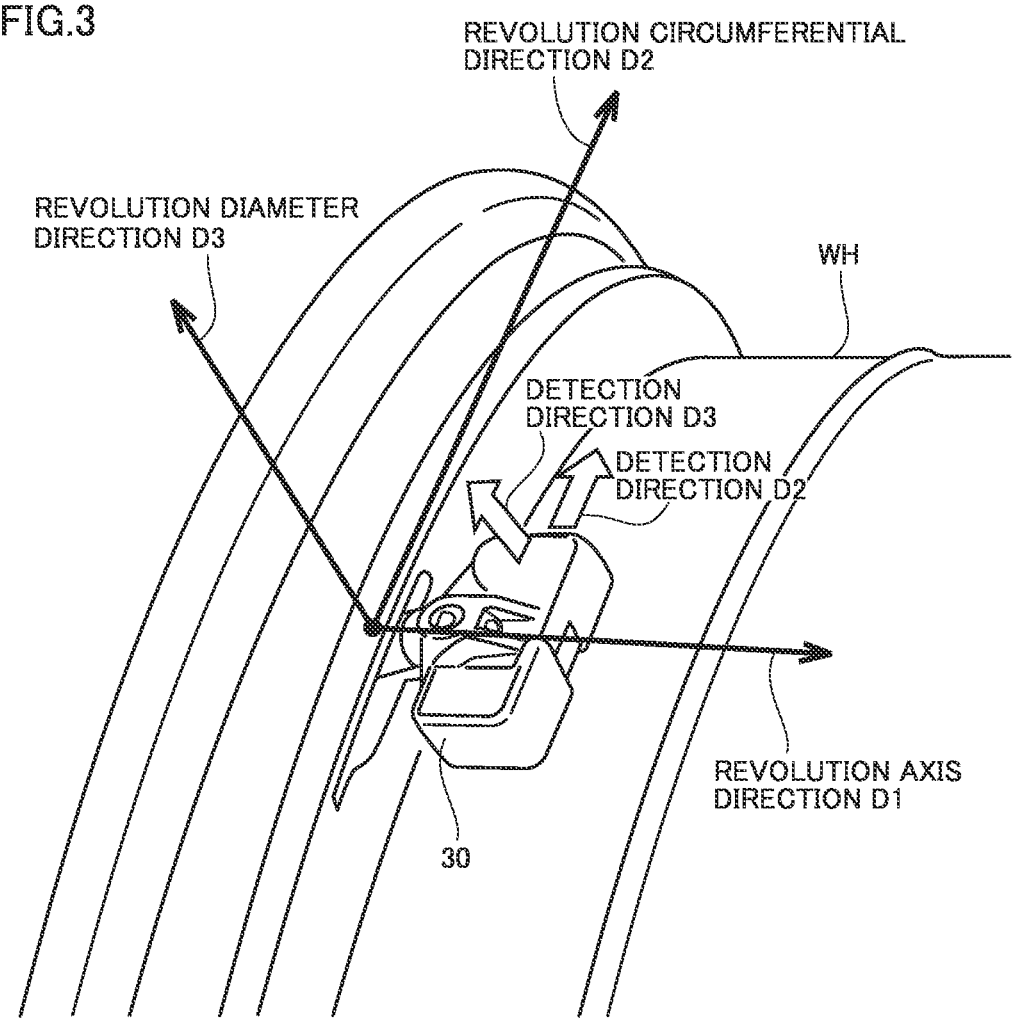
FIG. 3 is a diagram showing an exemplary appearance of the tire detector.

FIG. 3 is a diagram showing an exemplary appearance of tire detector 30. Tire detector 30 is attached as being fixed to a wheel WH of tire 10. A position of tire detector 30 changes with revolution of tire 10.

FIG. 3 shows a revolution axis direction D1, a revolution circumferential direction D2, and a revolution diameter direction D3 of wheel WH when tire 10 revolves. Acceleration sensor 39 of tire detector 30 is a biaxial acceleration sensor having revolution diameter direction D3 and revolution circumferential direction D2 as detection directions. In other words, acceleration sensor 39 detects an acceleration generated in revolution diameter direction D3 and an acceleration generated in revolution circumferential direction D2. The acceleration in revolution diameter direction D3 is used for a prescribed activation condition for transmission of a UHF signal. The acceleration in revolution circumferential direction D2 is used for determination as to whether or not tires have been rotated.

<As to Tire Position Determination Method>

The vehicle-mounted system in the present embodiment determines a tire position based on a detection value from each revolution speed sensor 80 and a detection value from acceleration sensor 39 of each tire detector 30. FIG. 4 is a diagram for illustrating an exemplary method of determining a tire position in the present embodiment.

FIG. 4 shows as waveforms, each of exemplary transition of an acceleration of gravity generated in revolution diameter direction D3 of tire 12 on the front right side during forward travel of vehicle 100, exemplary transition of a counter value of revolution speed sensor 82 on the front right side, and exemplary transition of a counter value of revolution speed sensor 81 on the front left side.

Controller 35 of tire detector 32 obtains over time, an acceleration generated in revolution diameter direction D3 from acceleration sensor 39. The acceleration generated in revolution diameter direction D3 includes a centrifugal component resulting from revolution of tire 10 and a gravity component (acceleration of gravity).

Figure 5:
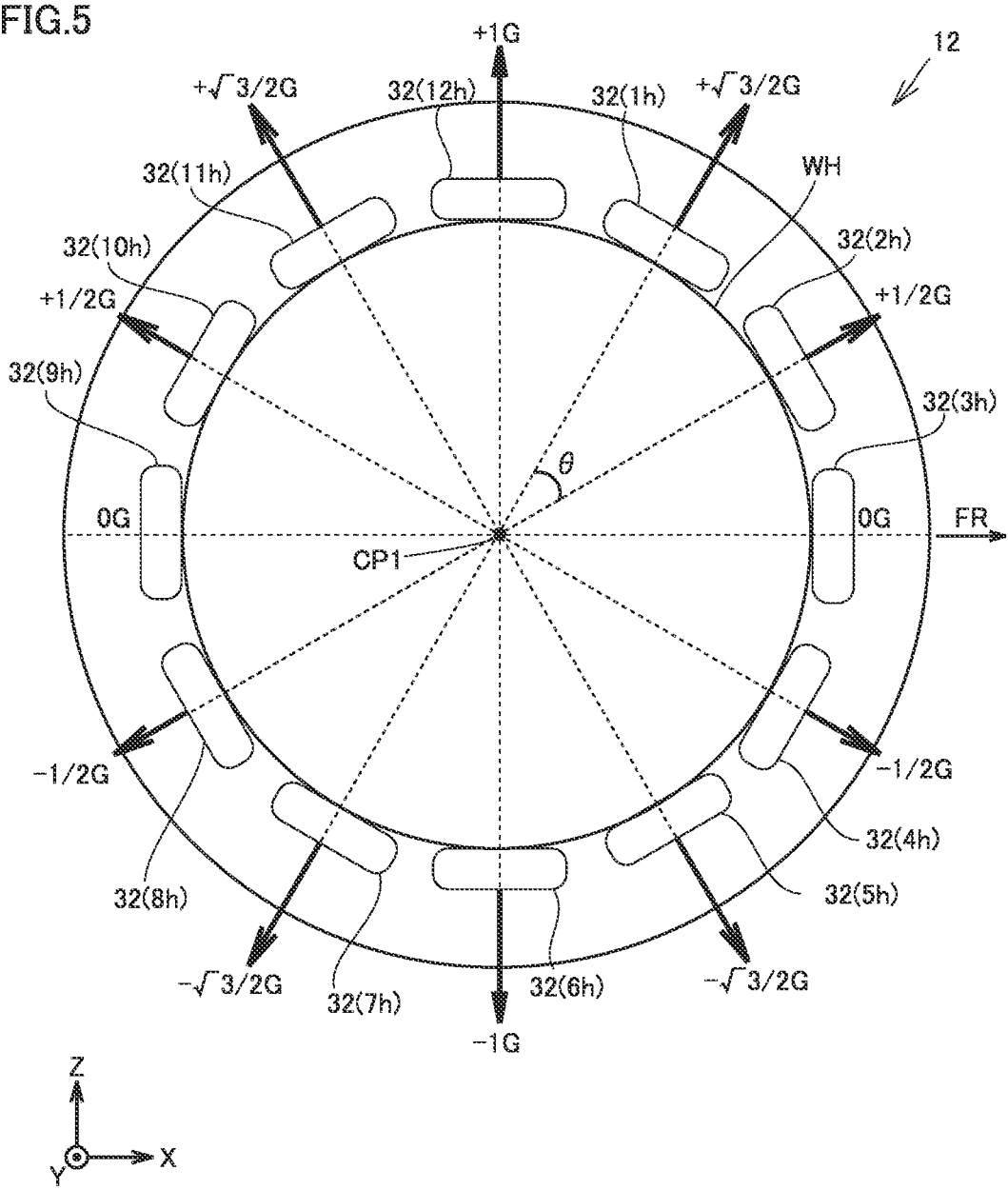
FIG. 5 is a transition diagram of arrangement of the tire detector when a tire on a front right side revolves.

A gravity component (acceleration of gravity) generated in revolution diameter direction D3 will be described below with reference to an example shown in FIG. 5. FIG. 5 is a transition diagram of arrangement of tire detector 32 when tire 12 on the front right side revolves. FIG. 5 shows transition of arrangement of tire detector 32 when tire 12 is viewed from the positive side (outer side of vehicle 100) in the Y-axis direction.

FIG. 5 shows arrangements 1h to 12h as twelve patterns of exemplary arrangement of tire detector 32. Arrangement 12h of tire detector 32 is such an arrangement that tire detector 32 is located in revolution diameter direction D3 extending from a central point CP1 of tire 12 in the positive direction along the Z-axis. Arrangement 1h represents arrangement of tire detector 32 when tire 12 revolves by θ degrees clockwise from the state of arrangement 12h. Arrangement 2h represents arrangement of tire detector 32 when tire 12 revolves by θ degrees clockwise from the state of arrangement 1h.

As shown in FIG. 5, in arrangement 12h (0 degree) or arrangement 6h (+180 degrees) of tire detector 32, an absolute value of the acceleration of gravity in the detection direction is largest. In the example in FIG. 5, the detection value from acceleration sensor 39 in revolution diameter direction D3 when tire detector 32 is in arrangement 12h is +1 G. The detection value from acceleration sensor 39 in revolution diameter direction D3 when tire detector 32 is in arrangement 6h is −1 G. Depending on a direction of attachment of tire detector 32, positive and negative signs of the acceleration of gravity as the detection value shown in FIG. 5 may be reversed. It is noted that 1 G is equal to 9.8 m/s$^2$.

The gravity component (acceleration of gravity) generated in revolution diameter direction D3 thus changes depending on arrangement of tire detector 32. While tire 12 is revolving, transition of the acceleration of gravity generated in revolution diameter direction D3 exhibits a sinusoidal wave as shown in FIG. 4. The sinusoidal wave shown in FIG. 4 is illustrated as a sinusoidal wave having a constant period for the sake of simplification of description. When a revolution speed of tire 12 is not constant, the period of the sinusoidal wave may constantly vary.

Controller 35 calculates a centrifugal component based on transition of the acceleration in revolution diameter direction D3 detected by acceleration sensor 39. Controller 35 desirably removes the calculated centrifugal component from the acceleration in revolution diameter direction D3 detected by acceleration sensor 39 to extract only the gravity component (acceleration of gravity).

FIG. 4 shows transition of the gravity component (acceleration of gravity) after the centrifugal component is removed from the acceleration generated in revolution diameter direction D3. Tire detector 30 can thus determine timing when the position of tire detector 30 is in arrangement 12h based on the calculated acceleration of gravity generated in revolution diameter direction D3. Tire detector 30 in the present embodiment transmits the UHF signal at timing when the position of tire detector 30 is in arrangement 12h.

More specifically, tire detector 30 transmits the UHF signal when the acceleration of gravity attains to +1 G after lapse of a prescribed transmission interval Dr since last transmission of the UHF signal. For example, transmission interval Dr is set to one minute. Tire detector 30 should only be able to transmit the UHF signal at the acceleration of gravity at which arrangement of tire detector 30 can uniquely be specified and may transmit the UHF signal when the acceleration of gravity attains to −1 G.

Tire detector 30 transmits the UHF signal by being triggered by the fact that it is located in arrangement 12h based on a revolution position of tire 10 after lapse of one minute since last transmission of the UHF signal. When data on last transmission of the UHF signal is not stored in storage 36, tire detector 30 transmits the UHF signal by being triggered only by the fact that it is located in arrangement 12h. The waveform shown in FIG. 4 may include the centrifugal component.

In the example in FIG. 4, at timing t1, tire detector 32 is located in arrangement 12h and the acceleration of gravity attains to +1 G. At timing t1, tire detector 32 transmits the UHF signal. In other words, at timing t1, the UHF signal is transmitted and received between tire detector 32 and monitoring unit 45. Monitoring unit 45 receives the UHF signal including the ID number "02". Tire detector 32 starts counting of the timer for counting transmission interval Dr from timing t1 of transmission of the UHF signal.

In the example in FIG. 4, a period from timing t1 to timing t2 corresponds to transmission interval Dr. When the acceleration of gravity attains to +1 G after timing t2, regarding the prescribed activation condition as having been satisfied, tire detector 32 transmits the UHF signal. In other words, at timing t3, tire detector 32 transmits the UHF signal. Thereafter, while vehicle 100 is traveling, tire detector 32 transmits the UHF signal each time the prescribed activation condition is satisfied.

Monitoring unit 45 refers to a detection value (counter value) from each of revolution speed sensors 81 to 84 at timings t1, t3, and t5 of reception of the UHF signal. In the waveforms showing exemplary counter values of revolution speed sensors 81 and 82 shown in FIG. 4, the ordinate represents the counter values of revolution speed sensors 81 and 82 and the abscissa represents elapsed time. The counter values of revolution speed sensors 81 and 82 increase with forward travel of vehicle 100 and revolution of tires 11 to 14.

Each of tires 11 to 14 provided in vehicle 100 independently revolves for the purpose of prevention of slip or the like. In other words, tires 11 to 14 are different from one another in period of revolution. Therefore, the counter values of revolution speed sensors 81 and 82 increase at rates different from each other also in the exemplary waveforms shown in FIG. 4.

Monitoring unit 45 obtains the counter value from each revolution speed sensor 80 at timing t1 of reception of the UHF signal. Monitoring unit 45 obtains a counter value X1 from revolution speed sensor 82 on the front right side. Monitoring unit 45 obtains a counter value X3 from revolution speed sensor 81 on the front left side. Though FIG. 4 shows only revolution speed sensors 81 and 82 for the sake of simplification of description, monitoring unit 45 obtains a counter value from each of revolution speed sensors 83 and 84.

Then, monitoring unit 45 obtains the counter value from each revolution speed sensor 80 at timing t3 of reception of the UHF signal from tire detector 32. Monitoring unit 45 obtains counter value X1 from revolution speed sensor 82 on the front right side. Monitoring unit 45 obtains a counter value X2 from revolution speed sensor 81 on the front left side.

Monitoring unit 45 can determine that revolution speed sensor 81 different in counter value between timing t1 and timing t3 and tire 12 to which tire detector 32 that has transmitted the UHF signal including the ID number "02" is attached are not in synchronization with each other. Monitoring unit 45 can thus determine that the tire position of tire 12 to which tire detector 32 that has transmitted the UHF signal including the ID number "02" is attached is not the front left side.

On the other hand, monitoring unit 45 can determine that revolution speed sensor 82 identical in counter value between timing t1 and timing t3 may be in synchronization with tire 12 to which tire detector 32 that has transmitted the UHF signal including the ID number "02" is attached. Monitoring unit 45 can thus determine that the tire position of tire 12 to which tire detector 32 that has transmitted the UHF signal including the ID number "02" is attached may be the front right side. The period of the counter value from revolution speed sensor 82 and the period of one revolution of tire 12 are in synchronization with each other. Therefore, when the position of tire detector 32 is located in arrangement 12*h*, the counter value from revolution speed sensor 82 is uniquely determined.

For tire positions brought in correspondence with revolution speed sensors 83 and 84 as well, monitoring unit 45 determines whether or not tire 12 to which tire detector 32 that has transmitted the UHF signal including the ID number "02" is attached may be arranged. Since each tire 10 independently revolves, the counter values from revolution speed sensor 80 not in synchronization may accidentally be the same between timing t1 and timing t3.

Monitoring unit 45 repeats determination by obtaining the counter value from revolution speed sensor 80 until it can uniquely specify the tire position of tire 12 to which tire detector 32 that has transmitted the UHF signal including the ID number "02" is attached. Thus, in the vehicle-mounted system in the present embodiment, the tire position is determined after transmission and reception of data a plurality of times between tire detector 30 and monitoring unit 45. In other words, monitoring unit 45 determines the tire position of tire 10 to which tire detector 30 is attached based on a plurality of UHF signals received at different timings from tire detector 30. The counter value of revolution speed sensor 80 may correspond to the "first revolution angle information" in the present disclosure. The acceleration of gravity generated in revolution diameter direction D3 of tire detector 30 may correspond to the "second revolution angle information" in the present disclosure.

The tire position determination method as shown in FIG. 4 is by way of example and the tire position determination method in the present embodiment should only be a method of determination of a tire position after transmission and reception of data a plurality of times between tire detector 30 and monitoring unit 45. For example, tire detector 30 may be configured to transmit the UHF signal at transmission intervals Dr different for each tire position and monitoring unit 45 may determine the tire position based on the number of times of reception of the UHF signal per unit period.

The tire position determination method may be a method of determination based on reception intensity of the UHF signal. For example, TPMS receiver 40 is arranged at a position where distances between TPMS receiver 40 and tires 10 are different from one another. TPMS receiver 40 thus receives UHF signals at different reception intensities from tire detectors 30. TPMS receiver 40 determines the tire position of tire 10 to which each tire detector 30 is attached based on an average of reception intensities of UHF signals received from tire detectors 30.

<Detection of Tire Rotation>

Tire detector 30 in the present embodiment detects tire rotation based on a detection value from acceleration sensor 39. When tire detector 30 detects tire rotation, it shortens transmission interval Dr of the UHF signal.

Figure 6:
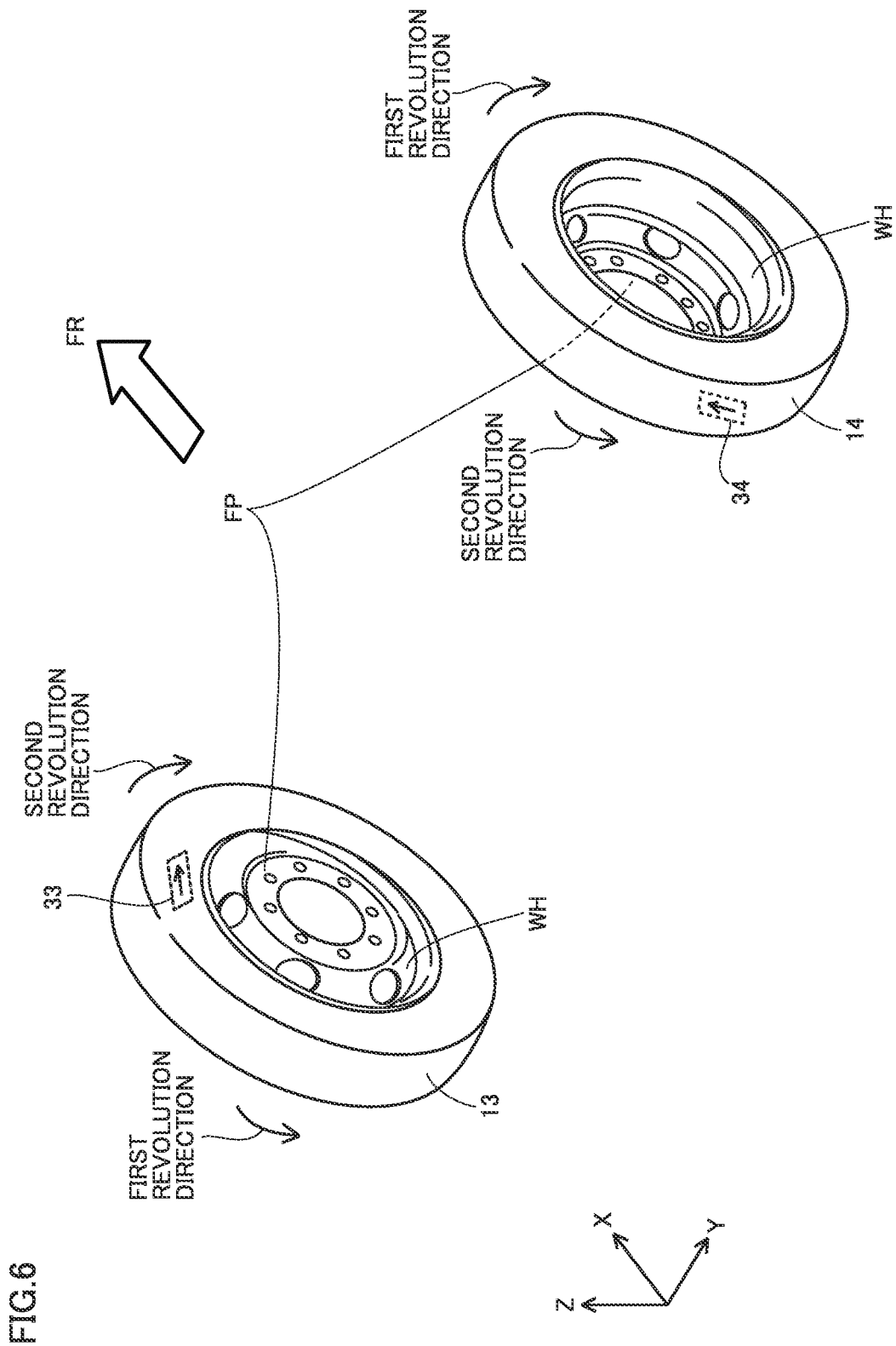
FIG. 6 is a diagram showing the tire before tire rotation.

Exemplary detection of tire rotation by tire detector 30 will be described below with reference to FIGS. 6 to 8. FIG. 6 is a diagram showing tires 13 and 14 before tire rotation. As described with reference to FIG. 1, tires 13 and 14 are attached to vehicle 100 as rear wheels. When a design surface of wheel WH that can visually be recognized from the outside of vehicle 100 is defined as a front surface, a surface FP of wheel WH of each of tires 13 and 14 is a rear surface on the back of the design surface. In other words, surface FP is a surface of the wheel that is difficult to visually recognize from the outside of vehicle 100 and a surface a direction of normal to which is oriented toward the inside of vehicle 100. Tires 13 and 14 are fixed with surfaces FP of wheels WH thereof face each other.

As described with reference to FIG. 3, acceleration sensor 39 detects also the acceleration generated in revolution circumferential direction D2 in addition to revolution diameter direction D3. Tire detector 30 (tire detector 33 and tire detector 34) is fixed to each wheel WH so as to detect, as a positive value, the acceleration in revolution circumferential direction D2 during acceleration in revolution in a first revolution direction which is a counterclockwise direction when tire 10 is viewed from surface FP and detect, as a negative value, the acceleration in revolution circumferential direction D2 during acceleration in revolution in a second revolution direction which is a clockwise direction when tire 10 is viewed from surface FP. While vehicle 100 travels forward, tire 14 revolves in the first revolution direction and tire 13 revolves in the second revolution direction.

Therefore, when vehicle 100 accelerates in the direction of forward travel, tire detector 34 of tire 14 on the right side of the vehicle detects a positive acceleration in revolution circumferential direction D2, whereas tire detector 33 of tire 13 on the left side of the vehicle detects a negative acceleration in revolution circumferential direction D2 equal in magnitude to the acceleration detected by tire detector 34. When vehicle 100 decelerates while it is traveling forward, tire detector 34 of tire 14 on the right side of the vehicle detects a negative acceleration in revolution circumferential direction D2, whereas tire detector 33 of tire 13 on the left side of the vehicle detects a positive acceleration in revolution circumferential direction D2 equal in magnitude to the acceleration detected by tire detector 34.

Figure 7:
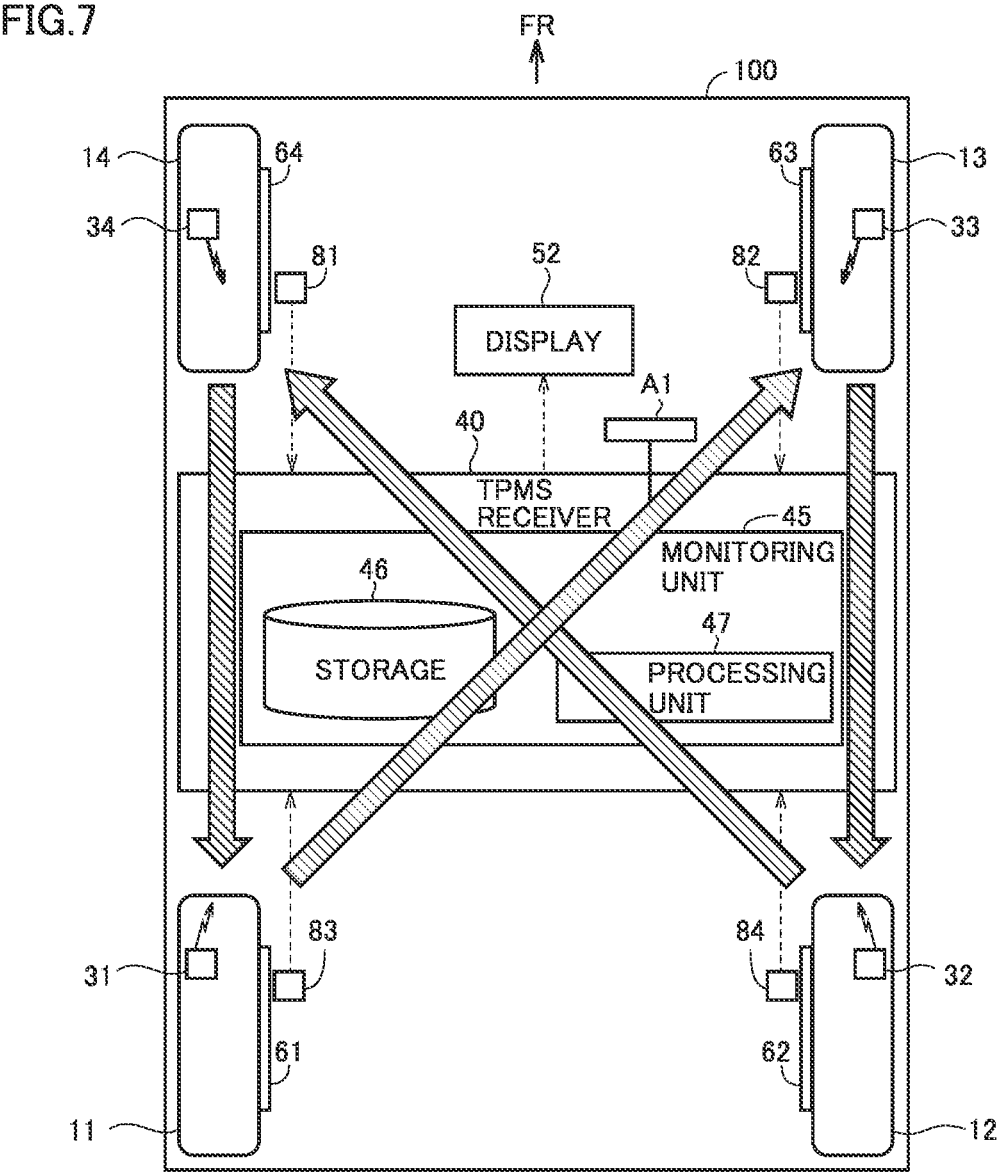
FIG. 7 is a diagram showing exemplary tire rotation.

FIG. 7 is a diagram showing exemplary tire rotation. As described with reference to FIG. 1, vehicle 100 is of the front-wheel drive type. In general, in tire rotation in a vehicle of the front-wheel drive type, tires are attached as being interchanged in position in such a manner that the tire on the front left side is moved to the tire position on the rear left side, the tire on the rear left side is moved to the tire position on the front right side, the tire on the front right side is moved to the tire position on the rear right side, and the tire on the rear right side is moved to the tire position on the front left side. The tire which was attached to the rear side is attached to the front side with the left and right sides being interchanged.

FIG. 7 shows a diagram after tire rotation of tire 10 attached to vehicle 100 described with reference to FIG. 1. Tire 14 which was attached on the rear right side in FIG. 1 is attached to the front left side, and tire 13 which was attached on the rear left side is attached on the front right side. FIG. 8 is a diagram showing tires 13 and 14 after tire rotation.

As shown in FIG. 7, when tires are attached with the left and right sides being interchanged, the direction of revolution of the tire when vehicle 100 travels forward is different between before and after tire rotation. Specifically, when vehicle 100 accelerates in the direction of forward travel after tire rotation, tire detector 33 of tire 13 attached on the right side of vehicle 100 detects a positive acceleration in revolution circumferential direction D2, whereas tire detector 34 of tire 14 attached on the left side of vehicle 100 detects a negative acceleration in revolution circumferential direction D2 equal in magnitude to the acceleration detected by tire detector 33. When vehicle 100 decelerates while it is traveling forward, tire detector 33 of tire 13 attached on the right side of vehicle 100 detects a negative acceleration in revolution circumferential direction D2, whereas tire detector 34 of tire 14 attached on the left side of vehicle 100 detects a positive acceleration in revolution circumferential direction D2 equal in magnitude to the acceleration detected by tire detector 33.

Figure 8:
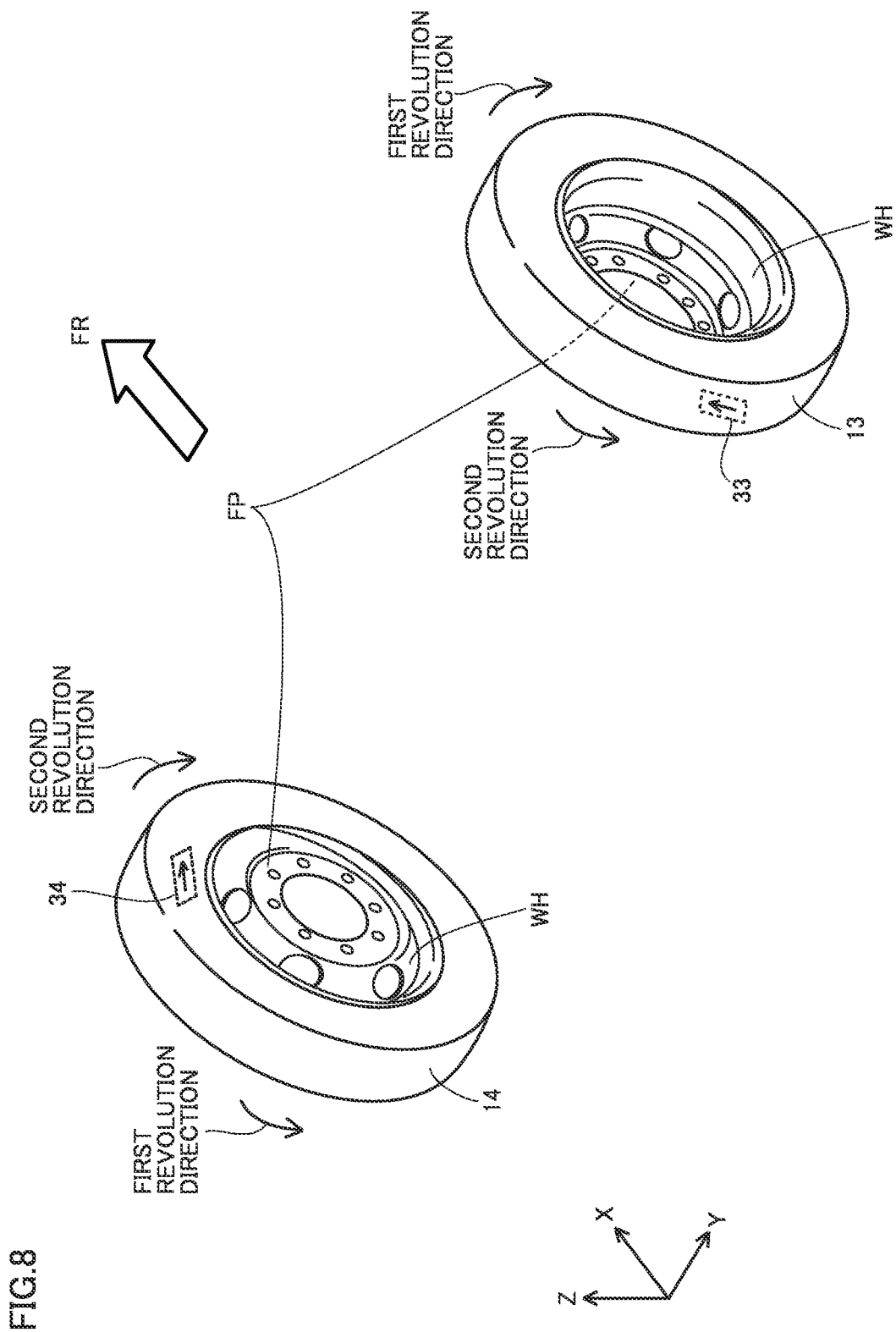
FIG. 8 is a diagram showing the tire after tire rotation.

FIGS. 6 to 8 illustrate that there are tires 10 attached with the left and right sides being interchanged, in general tire rotation in vehicle 100 of the front-wheel drive type. There are tires 10 attached with the left and right sides being interchanged also similarly in a vehicle of the rear-wheel drive type or the all-wheel drive type.

In tire rotation in the vehicle of the rear-wheel drive type or the all-wheel drive type, in general, the tire on the rear left side is attached at the tire position on the front left side, the tire on the front left side is attached at the tire position on the rear right side, the tire on the rear right side is attached at the tire position on the front right side, and the tire on the front right side is attached at the tire position on the rear left side. The tires which were attached on the front side are attached on the rear side with the left and right sides being interchanged. In other words, the direction of revolution in forward travel of the vehicle, of the tire moved from the front side to the rear side is different between before and after tire rotation.

Thus, in general tire rotation in the vehicle of any of the front-wheel drive type, the rear-wheel drive type, and the all-vehicle wheel drive type, there are tires attached with the left and right sides being interchanged. The technique described in the present embodiment is applicable to a scene where the left and right sides of positions of attachment along a direction of the entire length of the vehicle, of at least one set of (that is, at least two) tires are interchanged. Each tire 10 to which the vehicle-mounted system in the present embodiment is applied is a tire without a directional pattern.

Tire detector 30 in the present embodiment determines whether or not tires have been rotated based on the acceleration in revolution circumferential direction D2. As described with reference to FIG. 3, acceleration sensor 39 of tire detector 30 detects the acceleration in revolution circumferential direction D2. Whether the acceleration in revolution circumferential direction D2 is detected as the positive value or the negative value is determined based on the direction of revolution of tire 10 and whether vehicle 100 is accelerating or decelerating.

Tire detector 30 in the present embodiment calculates a ratio between the positive value and the negative value of the acceleration in revolution circumferential direction D2 over a time period of travel of vehicle 100. In a general vehicle, a time period for which a brake is driven is shorter than a time period for which an accelerator is driven. Therefore, when an acceleration period and a deceleration period in a forward travel period of vehicle 100 are compared with each other, the acceleration period is longer than the deceleration period. In other words, a period for which acceleration sensor 39 detects the acceleration in revolution circumferential direction D2 as a positive value is longer than a period for which acceleration sensor 39 detects the acceleration in revolution circumferential direction D2 as a negative value.

Tire detector 30 calculates the ratio between the positive value and the negative value of the acceleration in revolution circumferential direction D2 over the time period of travel of vehicle 100 and determines whether the direction of revolution of tire 10 in forward travel of vehicle 100 is the first revolution direction or the second revolution direction. Tire detector 30 determines that the direction of revolution of tire 10 in rearward travel of vehicle 100 is the direction reverse to the direction of revolution in forward travel. Processing for determining whether the direction of revolution of tire 10 in forward travel of vehicle 100 is the first revolution direction or the second direction of travel is referred to as processing for determining the direction of revolution of tire 10 below.

Each time a predetermined condition is satisfied, tire detector 30 performs processing for determining the direction of revolution of tire 10. When tire detector 30 determines that the direction of revolution of tire 10 in forward travel of vehicle 100 has changed, it determines that tires have been rotated. This is because the direction of revolution of tire 10 in forward travel of vehicle 100 changes only when tire 10 is attached on a different side of the left and right sides. Tire detector 30 may perform processing for determining the direction of revolution of tire 10 not based on the acceleration generated in revolution circumferential direction D2. For example, tire detector 30 may perform processing for determining the direction of revolution of tire 10 based on the acceleration generated in revolution diameter direction D3.

When tire detector 30 in the present embodiment determines that vehicle 100 remains stopped for a prescribed period or longer, it performs processing for determining the direction of revolution of tire 10. Tires are rotated while vehicle 100 remains stopped. Therefore, by performing processing for determining the direction of revolution of tire 10 after vehicle 100 remained stopped for the prescribed period or longer, the determination processing can be performed at appropriate timing and processing load imposed on processing unit 37 can be lessened. Tire detector 30 determines travel or stop of vehicle 100 based on whether or not the detection value from acceleration sensor 39 is changing.

<Shortening of Interval of Transmission of UHF Signal>

When tire detector 30 in the present embodiment determines that tires have been rotated, it shortens transmission interval Dr. In other words, tire detector 30 increases a frequency of transmission of the UHF signal. For example, tire detector 30 shortens transmission interval Dr from one minute to fifteen seconds. Monitoring unit 45 can thus receive a plurality of UHF signals transmitted from tire detector 30 in a shorter period.

Since monitoring unit 45 in the present embodiment can receive the UHF signal for specifying the tire position in a short period, time required for determination of the tire position can be shortened. Since transmission interval Dr is shortened upon detection of tire rotation, operating time of tire detector 30 can be short when tires are not rotated, and power consumption can be suppressed.

Tire detector 30 sets transmission interval Dr back to the original transmission interval based on the fact that the number of times of transmission of the UHF signal reaches a predetermined defined number of times after transmission interval Dr is shortened. In other words, tire detector 30 extends transmission interval Dr from fifteen seconds to one minute. The vehicle-mounted system thus prevents increase in power consumption due to transmission interval Dr kept shortened. The predetermined defined number of times is the number of times sufficient for monitoring unit 45 to determine the tire position, and may be determined in experiments or the like.

The frequency of transmission of the UHF signal at transmission interval Dr (for example, one minute) before tire rotation may correspond to the "first frequency" in the present disclosure. The frequency of transmission of the UHF signal at transmission interval Dr (for example, fifteen seconds) after tire rotation may correspond to the "second frequency" in the present disclosure.

<Flowchart>

FIG. 9 is a flowchart showing processing for switching a frequency of transmission of the UHF signal. The flowchart shown in FIG. 9 is performed by tire detector 30. Tire detector 30 determines whether or not a prescribed period or longer has elapsed since stop of vehicle 100 (step S101). When the detection value from acceleration sensor 39 does not change for a predetermined period or longer, tire detector 30 determines that vehicle 100 remains stopped.

When the prescribed period or longer has not elapsed since stop of vehicle 100 (NO in step S101), tire detector 30 repeats processing in step S101. Tire detector 30 determines the direction of revolution of tire 10 in forward travel of vehicle 100 (step S102). Tire detector 30 determines whether or not the direction of revolution of tire 10 in forward travel of vehicle 100 has changed (step S103). Tire detector 30 determines whether or not the direction of revolution of tire 10 has changed from the direction of revolution before stop for the prescribed period or longer.

When tire detector 30 determines that the direction of revolution of tire 10 in forward travel of vehicle 100 has changed (YES in step S103), it shortens transmission interval Dr (step S104). In other words, regarding tires as having been rotated, tire detector 30 increases the frequency of transmission of the UHF signal. When tire detector 30 determines that the direction of revolution of tire 10 in forward travel of vehicle 100 has not changed (NO in step S103), the process returns to step S101 with tires being regarded as not having been rotated.

After transmission interval Dr is shortened, tire detector 30 determines whether or not the number of times of transmission of the UHF signal has reached the defined number of times (step S105). Tire detector 30 counts the number of times of transmission of the UHF signal after transmission interval Dr is shortened. When tire detector 30 determines that the number of times of transmission of the UHF signal has not reached the defined number of times (NO in step S105), it repeats processing in step S105.

When tire detector 30 determines that the number of times of transmission of the UHF signal has reached the defined number of times (YES in step S105), it sets transmission interval Dr back to the original transmission interval (step S106). In other words, transmission interval Dr is set to the transmission interval before it is shortened.

First Example of Determination of Tire Position by Monitoring Unit 45

As described above, in vehicle 100 of the front-wheel drive type, tire rotation shown in FIG. 7 is carried out. When monitoring unit 45 receives the UHF signal at shortened transmission interval Dr from any one of tire detectors 31 to 34, it can determine positions of other tires based on the direction of revolution of tire 10.

FIG. 10 is a flowchart showing tire position determination processing based on the direction of revolution of tire 10. The flowchart shown in FIG. 10 is performed by monitoring unit 45. Monitoring unit 45 determines whether or not it has received the UHF signal at shortened transmission interval Dr (step S201). When monitoring unit 45 does not receive the UHF signal at shortened transmission interval Dr (NO in step S201), it repeats processing in step S201.

When monitoring unit 45 has received the UHF signal at shortened transmission interval Dr (YES in step S201), it obtains tire 10 that revolves in the direction of revolution the same as the direction of revolution before change, of tire detector 30 that has transmitted the UHF signal at shortened transmission interval Dr (step S202). An example in which the UHF signal is received at shortened transmission interval Dr from tire detector 34 attached to tire 14 rotated from the tire position "rear right side" to the "front left side" will be described below with reference to the example in FIG. 7.

Monitoring unit 45 can obtain the direction of revolution of tire 10 from each tire detector 30. As described above, tire detector 30 can determine the direction of revolution when surface FP of attached tire 10 is two-dimensionally viewed, based on the detection value from acceleration sensor 39 during the acceleration period and the deceleration period of vehicle 100. In the example in FIG. 7, before tire rotation, tire 14 on the rear right side and tire 12 on the front right side revolve in the same direction of revolution when surface FP of each of them is two-dimensionally viewed. In other words, monitoring unit 45 obtains tire 12 that revolves in the direction of revolution identical to the direction of revolution before change, of the direction of revolution of tire 14 to which tire detector 34 that has transmitted the UHF signal at shortened transmission interval Dr is attached.

Monitoring unit 45 determines that the position of tire 12 has been interchanged in a front-rear direction (step S203). Specifically, monitoring unit 45 determines that the position of tire 12 has been changed from the "front right side" to the "rear right side." Since monitoring unit 45 can determine that the position of tire 12 that has been identical in direction of revolution to tire 14 the position of which has been interchanged in a lateral direction has been interchanged only in the front-rear direction, it can determine that the position of tire 12 has been changed from the "front right side" to the "rear right side."

Thus, the vehicle-mounted system in the present embodiment can determine the position of tire 12 without receiving the UHF signal from tire detector 32 attached to tire 12 and can shorten the time period required for determination of positions of tire 12 and tire 14.

Second Example of Determination of Tire Position
by Monitoring Unit 45

In vehicle 100 of the front-wheel drive type, as described above, tire rotation shown in FIG. 7 is carried out. When monitoring unit 45 receives the UHF signal at shortened transmission interval Dr from any one of tire detectors 31 to 34, it can determine the tire position of tire 10 to which each of tire detectors 31 to 34 is attached.

FIG. 11 is a flowchart showing tire position determination processing on the premise that tire rotation in FIG. 7 is carried out. The flowchart shown in FIG. 11 is performed by monitoring unit 45. Monitoring unit 45 determines whether or not it has received the UHF signal at shortened transmission interval Dr (step S301). When monitoring unit 45 does not receive the UHF signal at shortened transmission interval Dr (NO in step S301), it repeats processing in step S301.

When monitoring unit 45 has received the UHF signal at shortened transmission interval Dr (YES in step S301), it determines that the tire position of tire detector 30 that has transmitted the UHF signal at shortened transmission interval Dr has been interchanged in the front-rear direction and the lateral direction (step S302).

Hereafter, as in FIG. 10, an example in which the UHF signal is received at shortened transmission interval Dr from tire detector 34 attached to tire 14, the position of which has been changed from the tire position "rear right side" to the "front left side," will be described.

Specifically, in step S301 in FIG. 11, monitoring unit 45 receives the UHF signal at shortened transmission interval Dr from tire detector 34. Monitoring unit 45 obtains the "rear right side" from storage 46, as the tire position of tire 14 which was determined with the tire position determination method described above. Monitoring unit 45 changes the tire position of tire 14 from the "rear right side" to the "front left side" based on reception of the UHF signal at shortened transmission interval Dr from tire detector 34 attached to tire 14. In other words, monitoring unit 45 determines that the tire position of tire 14 has been interchanged in the front-rear direction and the lateral direction.

Then, monitoring unit 45 determines that the tire position of tire detector 30 which was attached at the tire position determined in step S302 has been interchanged in the front-rear direction (step S303). Specifically, monitoring unit 45 determines that the tire position of tire 11 that was attached at the tire position "front left side," which is the position of rotated tire 14, has been changed from the "front left side" to the "rear left side" and updates storage 46.

Then, monitoring unit 45 determines that the tire position of tire detector 30 that was attached at the tire position determined in step S303 has been interchanged in the front-rear direction and the lateral direction (step S304). Specifically, monitoring unit 45 determines that the tire position of tire 13 that was attached at the tire position "rear left side," which is the position of rotated tire 11, has been changed from the "rear left side" to the "front right side" and updates storage 46.

Then, monitoring unit 45 determines that the tire position of tire detector 30 that was attached at the tire position determined in step S304 has been interchanged in the front-rear direction and the lateral direction (step S305). Specifically, monitoring unit 45 determines that the tire position of tire 12 that was attached at the tire position "front right side," which is the position of rotated tire 13, has been changed from the "front right side" to the "rear right side" and updates storage 46.

Thus, the vehicle-mounted system in the present embodiment can determine the tire position of each tire 10 based on reception at shortened transmission interval Dr from any one of tire detectors 31 to 34. The vehicle-mounted system in the present embodiment can thus shorten the time period required for determination of the tire position of each tire 10.

It should be understood that the embodiment disclosed herein is illustrative and non-restrictive in every respect. The scope of the present disclosure is defined by the terms of the claims rather than the description above and is intended to include any modifications within the scope and meaning equivalent to the terms of the claims.

The illustrative embodiment and a modification thereof described above are specific examples of aspects below.

(1) A vehicle-mounted system according to one aspect of the present disclosure is a vehicle-mounted system provided in a vehicle including a tire, and includes a detector attached to the tire, the detector transmitting a detection signal, and a monitoring unit that determines a position of the tire based on a plurality of detection signals received from the detector. The detector determines a direction of revolution of the tire. When the detector determines change of the direction of revolution of the tire, the detector switches a frequency of transmission of the detection signal from a first frequency to a second frequency higher than the first frequency.

According to the aspect above, the vehicle-mounted system determines whether or not tires have been rotated based on change of the direction of revolution of the tire, and when it determines that the tires have been rotated, it increases the frequency of transmission of the detection signal. The vehicle-mounted system can thus shorten the time period required for determination of the tire position while it prevents increase in power consumption by the tire detector.

(2) In one aspect, when the detector determines stop of the vehicle for a prescribed period or longer and when the detector determines change of the direction of revolution of the tire from a direction of revolution before stop for the prescribed period or longer, the detector switches a frequency of output of the detection signal from the first frequency to the second frequency.

According to the aspect above, since the vehicle-mounted system performs processing for determining the direction of revolution of tire 10 only when it is highly likely that the tires have been rotated, processing load can be lessened.

(3) In one aspect, the detector determines the direction of revolution of the tire in forward travel of the vehicle based on a direction of an acceleration in a revolution circumferential direction of the tire.

According to the aspect above, tire detector 30 can determine the direction of revolution of tire 10 with the use of acceleration sensor 39.

(4) In one aspect, a revolution body sensor that detects as first revolution angle information, an angle of revolution of a revolution body that revolves in synchronization with revolution of the tire is further provided. The detection signal includes second revolution angle information on which determination of an angle of revolution of the tire can be based. The monitoring unit determines a position of the tire based on the first revolution angle information and the second revolution angle information.

According to the aspect above, the vehicle-mounted system can determine the tire position based on the angle of revolution of the tire and the angle of revolution of the revolution body.

(5) In one aspect, the tire is a tire without a directional pattern.

According to the aspect above, tire detector 30 is attached to the tire the direction of revolution of which is highly likely to change in forward travel of vehicle 100 when tires have been rotated.

(6) In one aspect, the tire is attached to the vehicle as one of a front wheel and a rear wheel of the vehicle. When the monitoring unit receives the detection signal from the detector at the second frequency, the monitoring unit obtains information of another tire the direction of revolution of which is identical to the direction of revolution before change when viewed from a prescribed surface of the tire, and determines that a position of the another tire has changed from the other to one of the front wheel and the rear wheel of the vehicle.

According to the aspect above, by receiving the detection signal at the second frequency from one detector, monitoring unit 45 can determine the position of the tire that revolved in the direction of revolution identical to that of another tire to which the detector has been attached, and can shorten processing for determining the position of each tire 10 provided in vehicle 100.

(7) In one aspect, the tire is attached to the vehicle as one of a right wheel and a left wheel with respect to a direction of an entire length of the vehicle and one of a front wheel and a rear wheel of the vehicle. When the monitoring unit receives the detection signal from the detector at the second frequency, the monitoring unit determines that a position of the tire has changed from one to the other of the right wheel and the left wheel with respect to the direction of the entire length of the vehicle and has changed from one to the other of the front wheel and the rear wheel of the vehicle, and determines that a position of another tire that was attached to the other of the right wheel and the left wheel with respect to the direction of the entire length of the vehicle and to the other of the front wheel and the rear wheel of the vehicle has changed from the other to one of the front wheel and the rear wheel of the vehicle.

According to the aspect above, by receiving the detection signal at the second frequency from one detector, monitoring unit 45 can determine the position of another tire and hence can shorten processing for determining the position of each tire 10 provided in vehicle 100.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A vehicle-mounted system provided in a vehicle including a tire, the vehicle-mounted system comprising:
   a detector attached to the tire, the detector transmitting a detection signal; and
   a monitoring unit that determines a position of the tire based on a plurality of detection signals received from the detector, wherein
   the detector determines a direction of revolution of the tire, and
   when the detector determines change of the direction of revolution of the tire, the detector switches a frequency of transmission of the detection signal from a first frequency to a second frequency higher than the first frequency.

2. The vehicle-mounted system according to claim 1, wherein
   when the detector determines stop of the vehicle for a prescribed period or longer and when the detector determines change of the direction of revolution of the tire from a direction of revolution before stop for the prescribed period or longer, the detector switches a frequency of output of the detection signal from the first frequency to the second frequency.

3. The vehicle-mounted system according to claim 1, wherein
   the detector determines the direction of revolution of the tire in forward travel of the vehicle based on a direction of an acceleration in a revolution circumferential direction of the tire.

4. The vehicle-mounted system according to claim 1, further comprising a revolution body sensor that detects as first revolution angle information, an angle of revolution of a revolution body that revolves in synchronization with revolution of the tire, wherein
   the detection signal includes second revolution angle information on which determination of an angle of revolution of the tire can be based, and
   the monitoring unit determines the position of the tire based on the first revolution angle information and the second revolution angle information.

5. The vehicle-mounted system according to claim 1, wherein
   the tire is a tire without a directional pattern.

6. The vehicle-mounted system according to claim 1, wherein
   the tire is attached to the vehicle as one of a front wheel and a rear wheel of the vehicle, and
   when the monitoring unit receives the detection signal from the detector at the second frequency, the monitoring unit
      obtains information of another tire the direction of revolution of which is identical to the direction of revolution before change when viewed from a prescribed surface of the tire, and
      determines that a position of the another tire has changed from the other to one of the front wheel and the rear wheel of the vehicle.

7. The vehicle-mounted system according to claim 1, wherein
   the tire is attached to the vehicle as one of a right wheel and a left wheel with respect to a direction of an entire length of the vehicle and one of a front wheel and a rear wheel of the vehicle, and
   when the monitoring unit receives the detection signal from the detector at the second frequency, the monitoring unit
      determines that a position of the tire has changed from one to the other of the right wheel and the left wheel with respect to the direction of the entire length of the vehicle and has changed from one to the other of the front wheel and the rear wheel of the vehicle, and
      determines that a position of another tire that was attached to the other of the right wheel and the left wheel with respect to the direction of the entire length of the vehicle and to the other of the front wheel and the rear wheel of the vehicle has changed from the other to one of the front wheel and the rear wheel of the vehicle.

* * * * *